USOO5760864A

United States Patent [19]
Yamada et al.

[11] Patent Number: 5,760,864
[45] Date of Patent: Jun. 2, 1998

[54] MANUFACTURING METHOD OF LIQUID DISPLAY DEVICES USING A STAINLESS STEEL SUCTION PLATE HAVING A PHOSPHORUS DOPED NICKEL COATING

[75] Inventors: Katsurou Yamada; Sumio Miyata, both of Tokyo, Japan

[73] Assignee: Kabushiki Kaisha Toshiba, Kawasaki, Japan

[21] Appl. No.: 683,887

[22] Filed: Jul. 19, 1996

[30] Foreign Application Priority Data

Jul. 20, 1995 [JP] Japan .................. 7-183645

[51] Int. Cl.$^6$ .................. G02F 1/13; B25B 11/00
[52] U.S. Cl. .................. 349/187; 269/21
[58] Field of Search .................. 349/153, 187; 269/21

[56] References Cited

U.S. PATENT DOCUMENTS 4,391,511 7/1983 Akiyama et al. .................. 269/21
5,326,420 7/1994 Vinouze et al. .................. 349/153
5,436,693 7/1995 Marumo .................. 269/21

FOREIGN PATENT DOCUMENTS 2-38047 2/1990 Japan.

Primary Examiner—William L. Sikes
Assistant Examiner—Walter Malinowski
Attorney, Agent, or Firm—Cushman Darby & Cushman IP Group of Pillsbury Madison & Sutro LLP

[57] ABSTRACT

An object of the present invention is to provide a liquid crystal display (LCD) device capable of suppressing or eliminating electrification of insulative substrates during the manufacture thereof to thereby attain enhanced display quality. To achieve the object, the invention is drawn to a method for manufacturing LCD devices having a liquid crystal layer as held between a pair of electrode substrates each of which includes an insulative substrate and an electrode disposed thereon, wherein the insulative substrate (11) is disposed for treatment on a support base (103) having the principal plane which is equal to or greater in surface roughness than 1.6 micrometers (µm) and yet less than or equal to 50 µm.

3 Claims, 4 Drawing Sheets

MANUFACTURING METHOD OF LIQUID DISPLAY DEVICES USING A STAINLESS STEEL SUCTION PLATE HAVING A PHOSPHORUS DOPED NICKEL COATING

BACKGROUND OF THE INVENTION

The present invention relates to a method for manufacturing liquid crystal display devices having liquid crystal material interposed between a pair of electrode substrates.

Recently, liquid crystal display (LCD) devices have been widely used in various fields of art due to their advanced features such as light weight, thinness, low power consumption, and others.

An LCD of the simple matrix type, by way of example, is presently available as one of such LCDs. The LCD of this type is generally arranged to include therein a pair of insulative or dielectric substrates made of a chosen transparent material such as glass, each of which has thereon a plurality of stripe-shaped transparent electrodes. The prior known LCD may be fabricated by forming an orientation film on one principal plane of the electrode substrate, performing rubbing treatments on this orientation film, causing the pair of electrode substrates to be subject at its periphery to sealing treatments using a seal material while holding a liquid crystal layer between the opposed electrode substrates, and then disposing a polarization plate on the outer surface of each electrode substrate.

Most of such a series of manufacturing steps mentioned above are carried out with the transparent insulative substrate being fixed or immovably mounted on a support base. Typically, insulative substrates and polarization plates for use in LCDs are electrically nonconductive; hence, undesirable delamination electrification will take place when the insulative substrate is detached or delaminated from the support base.

Upon occurrence of such electrification, the resulting charged insulative substrate will thereafter discharge and release electrical charges during the manufacture thereof. This adversely serves to raise several disadvantages, including a decrease in quality of orientation films, and the occurrence of defects in the electrodes and dielectric films, which in turn leads to extreme reduction of display quality in the LCDs.

SUMMARY OF THE INVENTION

The present invention has been made to avoid the problems faced with the prior art, and an object of the invention is to provide a method of manufacturing LCD devices capable of suppressing electrification of insulative substrates during the fabrication steps thereby attaining enhanced display quality.

The present invention provides a method for manufacturing a liquid crystal display (LCD) device having a liquid crystal layer held between a pair of electrode substrates each with an electrode on an insulative substrate, featured in that the said insulative substrate is disposed for treatment on a support base having a principal plane ranging in surface roughness from 1.6 to 50 micrometers (μm).

Preferably the insulative substrate is mounted by suction rigidly and immovably on the said support base.

In accordance with this invention, since the insulative substrate is specifically arranged such that it is mounted and fixed, for treatments, on the support base having the surface roughness (Ra) on its principal plane which falls within a range from 1.6 to 50 μm as described above, it becomes possible to suppress the occurrence of electrification otherwise occurring due to delamination of the insulative substrate from the support base, thereby minimizing or eliminating any production failures such as degradation of orientation films or destruction of electrodes and/or insulative films under manufacture. This may reduce the possibility of display deficiencies and display irregularity, the relay permitting efficient manufacture of LCD devices with uniformly excellent picture quality at an enhanced yield of production.

In this invention the surface roughness (Ra) on the principal plane of the support base is so set as to be equal to or greater than 1.6 μm by taking into account of the fact that, if it is less than 1.6 μm, the static electricity will take place more significantly when the insulative substrate is delaminated from the support base. Conversely, if the surface roughness (Ra) is greater than 50 μm, it becomes more difficult to secure it on the support base with high accuracy as required.

In situation where each of the electrode substrates comes with switching elements such as thin-film transistors (to be referred to as "TFTs" hereinafter) on the insulative substrate thereof, the surface roughness (Ra) is determined so that it ranges from 6.3 to 50 μm, thereby successfully eliminating any dielectric failures in gate insulation films and dielectric interlayer films thereof.

Another significant, more preferable advantage of this invention is that static electricity can be further suppressed or minimized by use of a combination with a suction or vacuum lock as the fixation scheme of the insulative substrate, as compared with any other presently available fixation schemes.

Preferably the support base comprises a stainless steel plate having a metal coat layer on its surface.

The present invention also preferably includes an arrangement wherein the coat layer is formed by a Kanizen metal plating.

It should be noted here that the "Kanizen metal plating" means the electroless metal plating using nickel (Ni) doped with phosphorus (P) therein. Employing such Kanizen metal plating may enable the resulting layer to decrease in resistivity on the surface thereof while attaining appropriate hardness, because of the fact that nickel acts as the major component. As a result, metallic powders are no longer produced which would otherwise appear due to possible contact with the insulative substrates. In addition, the use of the electroless metal plating technique may prevent any metal coat layer from locally growing at the corners of insulative substrates in a concentrated manner.

DESCRIPTION OF THE PREFERRED EMBODIMENTS

Some practical examples embodying the present invention and its comparison will now be described in detail as follows.

(EXAMPLE 1)

A step of forming an orientation film on an electrode substrate will be described below, which substrate consists of a transparent insulative or dielectric substrate made of glass, and a plurality of stripe-shaped transparent electrodes made of indium-tin-oxide (ITO) as disposed on one principal plane of the underlying dielectric substrate.

Figure 1A:
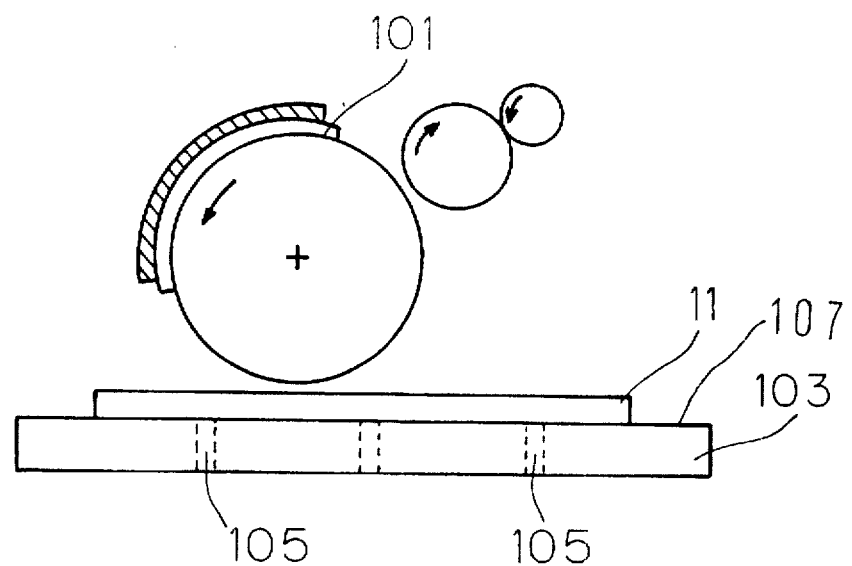
FIGS. 1A and 1B are diagrams showing a printing step of an orientation film in a manufacturing method in accordance with one embodiment of this invention.
Figure 1B:
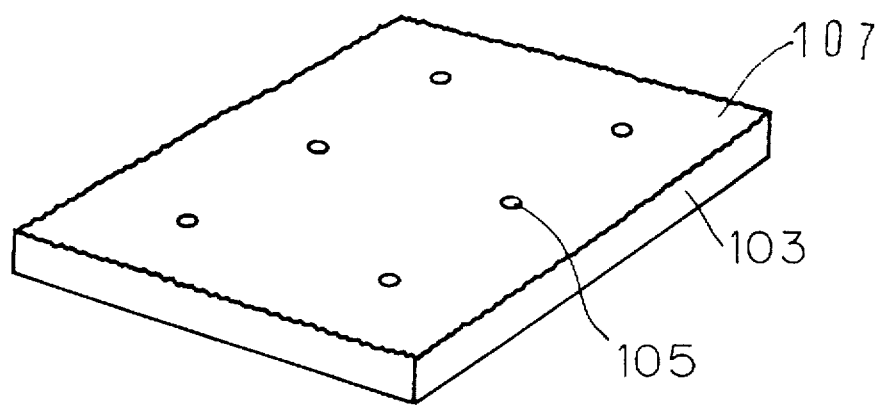

First, as shown in FIG. 1B, a print support base (103) is prepared which is constituted from a stainless steel (SUS) plate formed to exhibit a predefined surface shape and size, and which has a metal coat layer (107) deposited by Kanizen metal plating techniques on one surface thereof to have the surface roughness (Ra) of principal plane that measures 6.3 μm, wherein a predetermined number of holes (105) are formed in the support base (103). An electrode substrate (11) is immovably mounted by suction on this support base; subsequently, an orientation film is deposited using letterpress print plate (101) on the electrode substrate (11) as shown in FIG. 1A. Note here that the suction locking holes (105) are formed so that they have cut-away portions at their peripheral edges to define taper-like configuration as shown, while the metal coat layer (107) is coupled to ground.

Thereafter, while not illustrated in the drawing, the resulting electrode substrate (11) is similarly suction-fixed on a heated or "hot" plate having a surface roughness (Ra) of 6.3 μm on its principal plane, and then is heated at a certain temperature of approximately 70° C. for drying.

Figure 2:
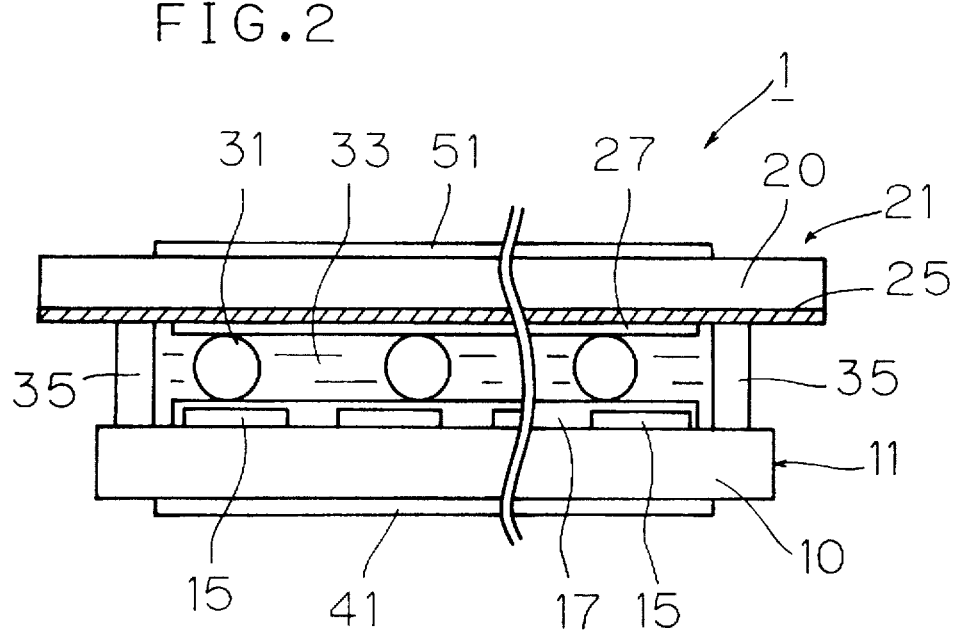
FIG. 2 is a schematic illustration of a cross-section of an LCD device as produced by the manufacturing method in accordance with the embodiment of this invention.

Thereafter, onto the electrode substrates (11), (21) which have transparent electrodes (15), (25) residing on the dielectric substrates (10), (20) respectively, orientation films (17), (27) are disposed (see FIG. 2); these orientation films (17), (27) are then subject to rubbing treatment. While the resultant pair of electrode substrates (11), (21) are disposed to oppose each other with spacers (31) being interposed therebetween, these are adhered together via sealant (35). After a liquid crystal material (33) is injected into the inner space between the opposed substrates thus adhered, the inlet for injection is sealed while causing polarization plates (41), (51) to be disposed on respective outer surfaces thereof, whereby a liquid crystal display (LCD) device (1) was obtained.

In situations where the print support base and hot plate having the 6.3-μm surface roughness (Ra) on principal plane are employed for processing treatments, it was demonstrated that the resulting LCDs could remain sufficiently lower in pin-point defect, line defect and display irregularity than those as produced similarly except for a different numerical setting in which the principal-plane roughness (Ra) of the print support base and hot plate is 1.0 μm.

Figure 6:
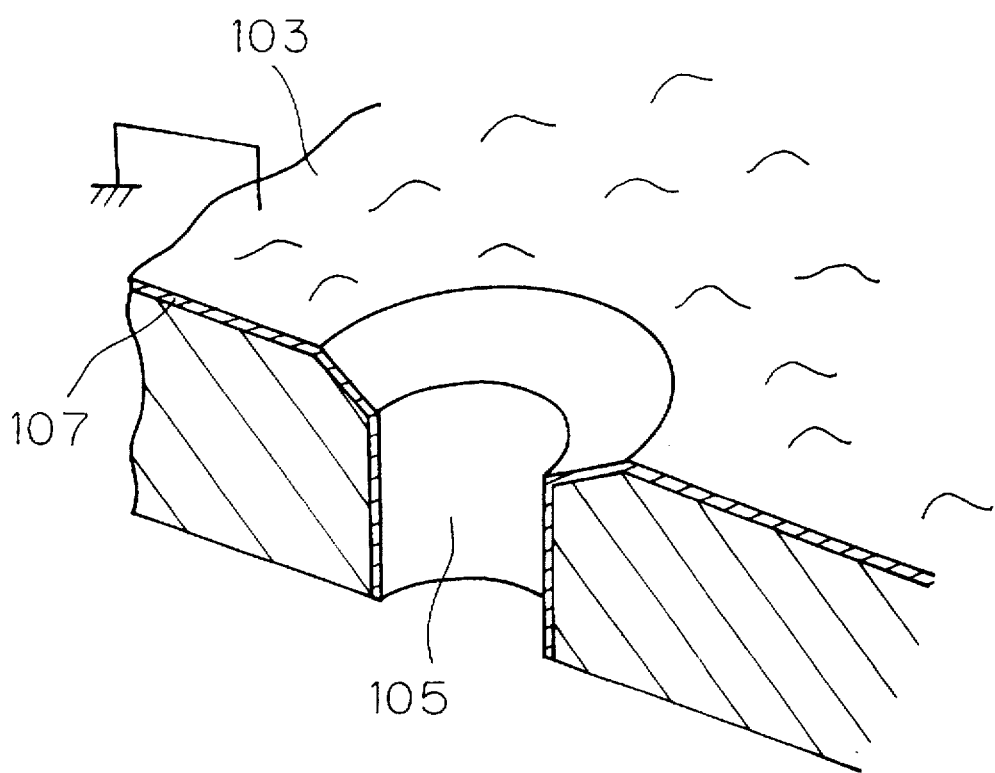
FIG. 6 is an enlarged longitudinal perspective view of a metal coat layer deposited by Kanizen metal-plating.

Now, the Kanizen metal-plating will be described with reference to FIG. 6.

The Kanizen metal-plating may be defined as the electroless one of phosphorus(P)-doped nickel (Ni). With this Kanizen metal-plating, since Ni is the major component for the metal-plating process, the target surface is lowered in resistivity while appropriate hardness is achieved. This may eliminate undesired production of metal powders otherwise occurring due to direct contact with the electrode substrate (11). Furthermore, due to the nature of such electroless metal-plating, it will no longer happen that a metal coat layer behaves to locally grow at the edges of suction-locking holes (105) and at the corner portions of the electrode substrate (11).

In the process of the Kanizen metal-plating, the SUS plate is subject to a grinding treatment while scratching or scaring the surface thereof to perform a surface coating process. The metal coat layer (107) is preferably 5 μm or less in thickness; especially, if it measures 3 μm or greater, a sufficient decrease in resistivity will be expectable. The reason for setting the thickness of the metal coat layer (107) to be equal to or less than 5 μm is that concentration of stress will never take place due to execution of metal-plating insofar as it remains equal to or less than 20 μm, in particular, less than 10 μm.

In the illustrative example, nickel was employed; however, silver may be used as an alternative. Note that gold and copper will not be preferable because the former material is too soft whereas the latter can adversely affect the injected liquid crystal layer.

(EXAMPLE 2)

Figure 3:
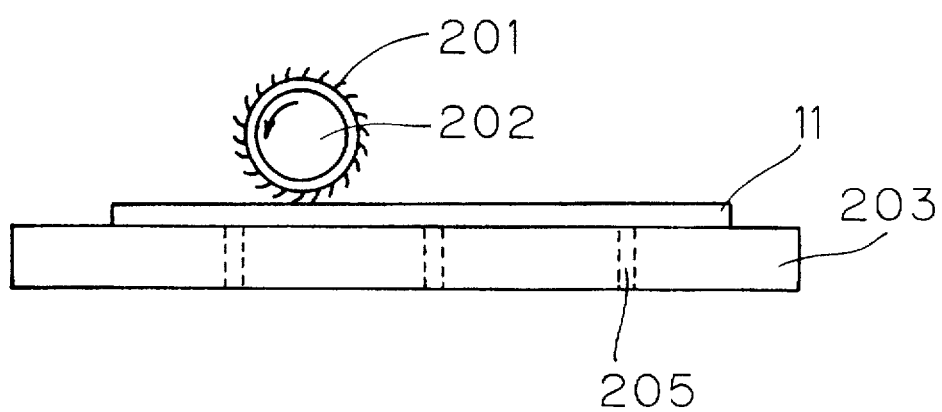
FIG. 3 is a diagram showing a rubbing step in a manufacturing method in accordance with another embodiment of the invention.

This example is similar to Example 1 with the rubbing processing step being modified for manufacture of the LCD (1) as follows: as shown in FIG. 3, support base (203) having the principal-plane surface roughness (Ra) of 10 μm is used which consists of an SUS plate having suction locking holes (205) and its surface as processed by Kanizen metal-plating; the electrode substrate (11) being suction-fixed on the support base is rubbed by a rotating roller (202), on which a rubbing cloth (201) made of rayon is wound.

The LCD thus manufactured as described above could offer enhanced advantages as to a further decrease in pin-point defects, line defects and display irregularity, which decrease is more significant than that of the LCD of the prior Example 1.

(EXAMPLE 3)

Figure 4:
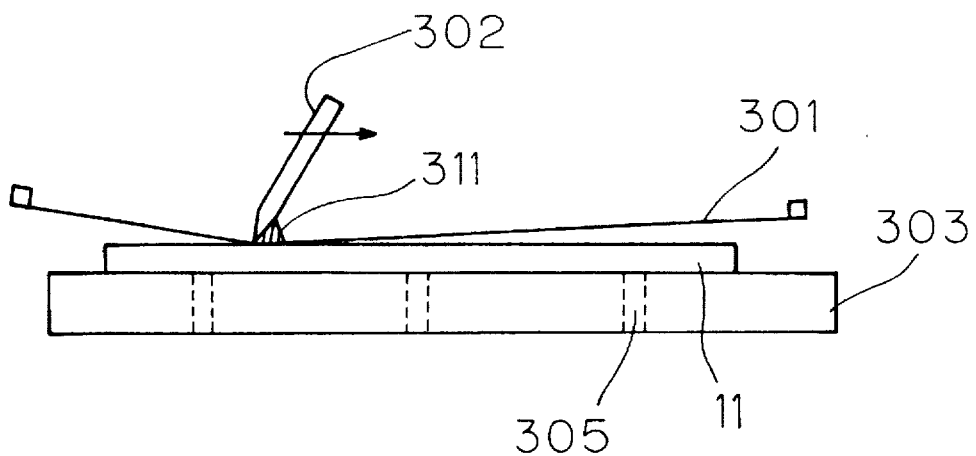
FIG. 4 is a diagram showing a seal-material printing step of a manufacturing method in accordance with still another embodiment of the invention.

This example is similar to Example 1 with the step of depositing the seal members (35) being modified for manufacture of the LCD (1) as follows: as shown in FIG. 4, the electrode substrate (11) with the orientation film formed thereon is suction-fixed on a print support base (303) having the principal-plane surface roughness (Ra) of 6.3 μm and suction locking holes (305), while allowing a one-component type epoxy adhesive to be subject to printing as a sealing adhesive (311) onto the electrode substrate (11) by use of a screen-mesh mask (301) and a squeegee tool (302) thereon.

The LCD thus manufactured as described above could offer much enhanced advantages as to a decrease in pin-point-defects, line defects and display irregularity, which is more significant than that of the LCD of Example 2 as discussed previously.

(EXAMPLE 4)

Figure 5:
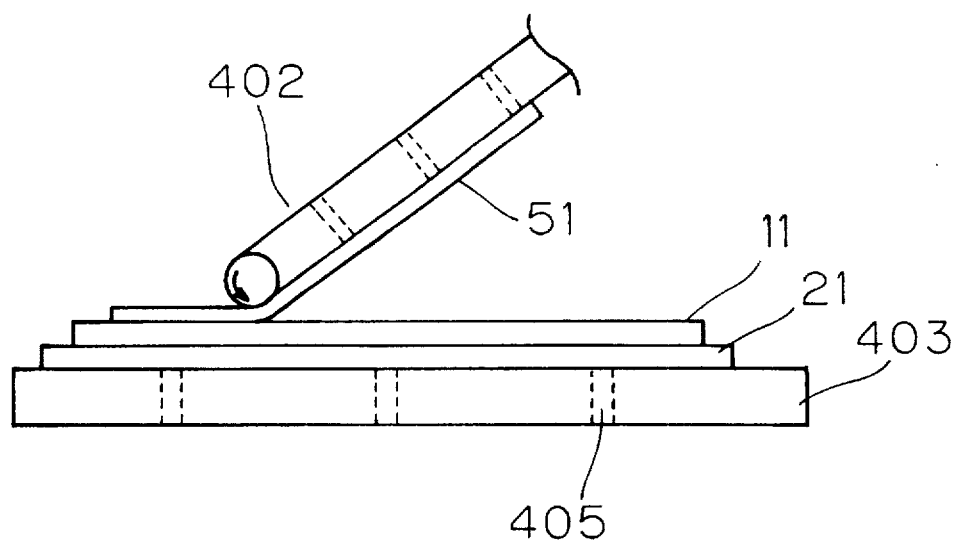
FIG. 5 is a diagram showing a polarization plate attachment step of a manufacturing method in accordance with a further embodiment of the invention.

This example is similar to Example 1 with the polarization-plate attachment step being modified for manufacture of the LCD (1) as follows: as shown in FIG. 5, a support base (403) is utilized which measures 10 μm in principal-plane surface roughness (Ra) and has suction-locking holes (405); a pair of electrode substrates (11), (21)

are mounted and suction-fixed on the base (403); and, the polarization plate (51) is adhered by use of an attachment roller (402).

The LCD thus manufactured as discussed above could offer further enhanced advantages as to a decrease in pinpoint defect, line defect and display irregularity, which may be more significant than that of the LCD of Example 3 as described above.

From the foregoing description it will be seen that in accordance with the manufacturing method of the present invention, it is possible to successfully suppress or minimize occurrence of static electricity on the substrate during the manufacture thereof, as compared with ones using prior known support base plates, thus enabling LCDs to be fabricated at enhanced yield of production while permitting improved performance for accomplishment of uniform and excellent display quality.

While the illustrative embodiments are directed to the method for manufacturing LCDs of the simple matrix type, this invention should not be exclusively limited to such type of LCDs, and may also be applied to others, in particular to active-matrix type LCDs having a switch element such as TFT at the individual one of picture elements or pixels on the flat display screen.

We claim:

1. A method for manufacturing a liquid crystal display device having a liquid crystal layer held between a pair of electrode substrates each having an electrode on a horizontal insulative substrate, said method comprising the steps of:

placing said horizontal insulative substrate on a support base having a principal plane ranging in surface roughness from 1.6 to 50 micrometers (µm); and treating said horizontal insulative substrate to create said liquid crystal display device, said horizontal insulative substrate being located on said support base for at least part of said step of treating, wherein said support base comprises a stainless steel plate having a metal coat layer on a surface thereof, and wherein said coat layer is formed by a nickel plating doped with phosphorus.

2. The method for manufacturing a liquid crystal display device according to claim 1, wherein said horizontal insulative substrate is immovably placed by suction on said support base.

3. A method for manufacturing a liquid crystal display device having a liquid crystal layer held between a pair of electrode substrates each having an electrode on an insulative substrate, wherein:

said insulative substrate is disposed for treatment on a horizontal support base having a principal plane ranging in surface roughness from 1.6 to 50 micrometers (µm), said insulative substrate is immovably placed by suction on said support base, said support base comprises a stainless steel plate with a metal coat layer on a surface thereof, and said coat layer is formed by a nickel plating doped with phosphorus.

* * * * *